(12) United States Patent
Bin Kamni et al.

(10) Patent No.: US 11,102,965 B2
(45) Date of Patent: Aug. 31, 2021

(54) HANDLE ASSEMBLY FOR SPINNING REEL AND SPINNING REEL

(71) Applicant: Shimano Components (Malaysia) SDN. BHD., Johor (MY)

(72) Inventors: Mohd Hisyamuddin Bin Kamni, Johor (MY); Md Shahid Bin Sowarni, Johor (MY); Yik Hui Chan, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 71 days.

(21) Appl. No.: 16/672,755

(22) Filed: Nov. 4, 2019

(65) Prior Publication Data

US 2020/0196584 A1   Jun. 25, 2020

(30) Foreign Application Priority Data

Dec. 25, 2018   (JP) .............................. JP2018-241177

(51) Int. Cl.
*A01K 89/01*   (2006.01)
*A01K 89/00*   (2006.01)

(52) U.S. Cl.
CPC .................................. *A01K 89/006* (2013.01)

(58) Field of Classification Search
CPC ................ A01K 89/004; A01K 89/006; A01K 89/01121
See application file for complete search history.

(56) References Cited

U.S. PATENT DOCUMENTS

| 4,524,923 | A  | * | 6/1985 | Tunoda | ................ | A01K 89/004 |
|           |    |   |        |        |                  | 242/245     |
| 8,950,697 | B2 | * | 2/2015 | Takamatsu | ........... | A01K 89/006 |
|           |    |   |        |        |                  | 242/282     |
| 2016/0270381 | A1 | * | 9/2016 | Saito | .................... | A01K 89/006 |
| 2018/0098530 | A1 | * | 4/2018 | Ikebukuro | ........... | F16F 15/1215 |

FOREIGN PATENT DOCUMENTS

JP   2014-023432 A   2/2014

* cited by examiner

*Primary Examiner* — Emmanuel M Marcelo
(74) *Attorney, Agent, or Firm* — United IP Counselors, LLC

(57) ABSTRACT

A handle assembly of a spinning reel is configured to be integrally rotatable with a drive shaft of the spinning reel. The handle assembly includes a shaft member, a handle arm, a tubular member, and an annular elastic member. The shaft member is configured to be integrally rotatable with the drive shaft. The handle arm is coupled to the shaft member. The tubular member is disposed between the drive shaft and the handle arm on the outer periphery of the shaft member in order to position the handle arm with respect to the drive shaft. The annular elastic member is disposed between the shaft member and the tubular member in order to regulate the tubular member from falling off the shaft member.

12 Claims, 5 Drawing Sheets

HANDLE ASSEMBLY FOR SPINNING REEL AND SPINNING REEL

CROSS-REFERENCE TO RELATED APPLICATIONS

This application claims priority to Japanese Patent Application No. 2018-241177, filed Dec. 25, 2018. The contents of that application are incorporated by reference herein in their entirety.

BACKGROUND

Technical Field

The present disclosure relates to a handle assembly for a spinning reel, particularly to a handle assembly for a spinning reel configured to be integrally rotatable with a drive shaft of the spinning reel.

Background Information

A handle assembly is disclosed in a conventional spinning reel (refer to Japanese Laid-open Patent Application Publication No. 2014-23432). The conventional handle assembly is configured to be integrally rotatable with a drive shaft. The handle assembly includes a handle arm, a shaft member (handle shaft), and a tubular member (shaft cover). In this handle assembly, the tubular member positions the handle arm with respect to the drive shaft. The tubular member is screwed into the shaft member, and thereby prevented from falling off the shaft member.

BRIEF SUMMARY

In the conventional handle assembly, in order to prevent the tubular member from falling off the shaft member, the tubular member is screwed into the shaft member. In this case, when the female screw portion of the tubular member is screwed into the male screw portion of the shaft member, the end portion of the female screw portion and the end portion of the male screw portion collide, which may cause damage to the female screw portion and/or the male screw portion.

The present disclosure has been made in view of the aforementioned circumstance, and an object of the present disclosure is to provide a handle assembly for a spinning reel that can suitably regulate the falling off of the tubular member from the shaft member.

A handle assembly for a spinning reel according to an aspect of the present disclosure is configured to be integrally rotatable with a drive shaft of a spinning reel. The handle assembly includes a shaft member, a handle arm, a tubular member, and an annular elastic member.

The shaft member is configured to be integrally rotatable with the drive shaft. The handle arm is coupled to the shaft member. The tubular member is disposed between the drive shaft and the handle arm on the outer periphery of the shaft member in order to position the handle arm with respect to the drive shaft. The annular elastic member is disposed between the shaft member and the tubular member in order to regulate the tubular member from falling off the shaft member.

In this handle assembly, the annular elastic member is disposed between the shaft member and the tubular member, whereby the tubular member can be suitably regulated from falling off the shaft member without providing a screw portion in each of the shaft member and the tubular member as in the prior art.

In the handle assembly for a spinning reel according to another aspect of the present disclosure, the shaft member has an arrangement portion configured to dispose the annular elastic member. In this case, the tubular member has an abutting portion that contacts the annular elastic member.

Here, in a state where the annular elastic member is disposed at the arrangement portion of the shaft member, the abutting portion of the tubular member is brought into contact with the annular elastic member, thereby regulating the tubular member from falling off the shaft member. With this configuration, the falling off of the tubular member from the shaft member can be further suitably regulated by the annular elastic member.

In the handle assembly for the spinning reel according to another aspect of the present disclosure, the arrangement portion is an annular recess that is recessed from the outer peripheral surface of the shaft member and extends in the circumferential direction. In this case, the abutting portion is a step portion having a bottom surface whose diameter is larger than the inner peripheral surface of the tubular member. With this configuration, the annular elastic member can be easily disposed on the arrangement portion. In addition, the abutting portion of the tubular member can be easily brought into contact with the annular elastic member. In other words, the falling off of the tubular member from the shaft member can be further suitably regulated by the annular elastic member.

In the handle assembly for the spinning reel according to yet another aspect of the present disclosure, in a state where the annular elastic member is disposed in the annular recess, a part of the annular elastic member is disposed outside the outer peripheral surface of the shaft member so that the part of the annular elastic member is in contact with a wall portion of the step portion. With this configuration, the falling off of the tubular member from the shaft member can be further suitably regulated by the annular elastic member.

In the handle assembly for the spinning reel according to yet another aspect of the present disclosure, the tubular member includes a first end portion provided closer to the drive shaft and a second end portion provided closer to the handle arm. In this case, the inner peripheral surface of the second end portion has a tapered portion whose diameter is enlarged toward the handle arm. With this configuration, the annular elastic member is guided from the tapered portion of the tubular member to between the shaft member and the tubular member, and thus can be easily disposed between the shaft member and the tubular member.

The handle assembly for the spinning reel according to yet another aspect of the present disclosure further includes a cover member that covers the tubular member. In this case, the cover member is configured to contact the handle arm and the tubular member in the axial direction. The tubular member is configured to contact the drive shaft and the cover member in the axial direction. With this configuration, the handle arm can be reliably positioned with respect to the drive shaft.

A spinning reel according to one aspect of the present disclosure includes a drive shaft and the above described handle assembly configured to be rotatable integrally with the drive shaft. Accordingly, the present spinning reel is capable of achieving an effect similar to the one mentioned above.

In the spinning reel according to another aspect of the present disclosure, the tubular member is held between the drive shaft and the cover member in a state where the shaft member is mounted on the drive shaft so as to be integrally rotatable therewith. In this case, the cover member is held between the handle arm and the tubular member. With this configuration, the handle arm can be reliably positioned with respect to the drive shaft.

According to the present disclosure, in the handle assembly of the spinning reel, the falling off of the tubular member from the shaft member can be suitably regulated by the annular elastic member.

BRIEF DESCRIPTION OF THE DRAWINGS

Referring now to the attached drawings which forma part of this original disclosure.

DETAILED DESCRIPTION

Figure 1:
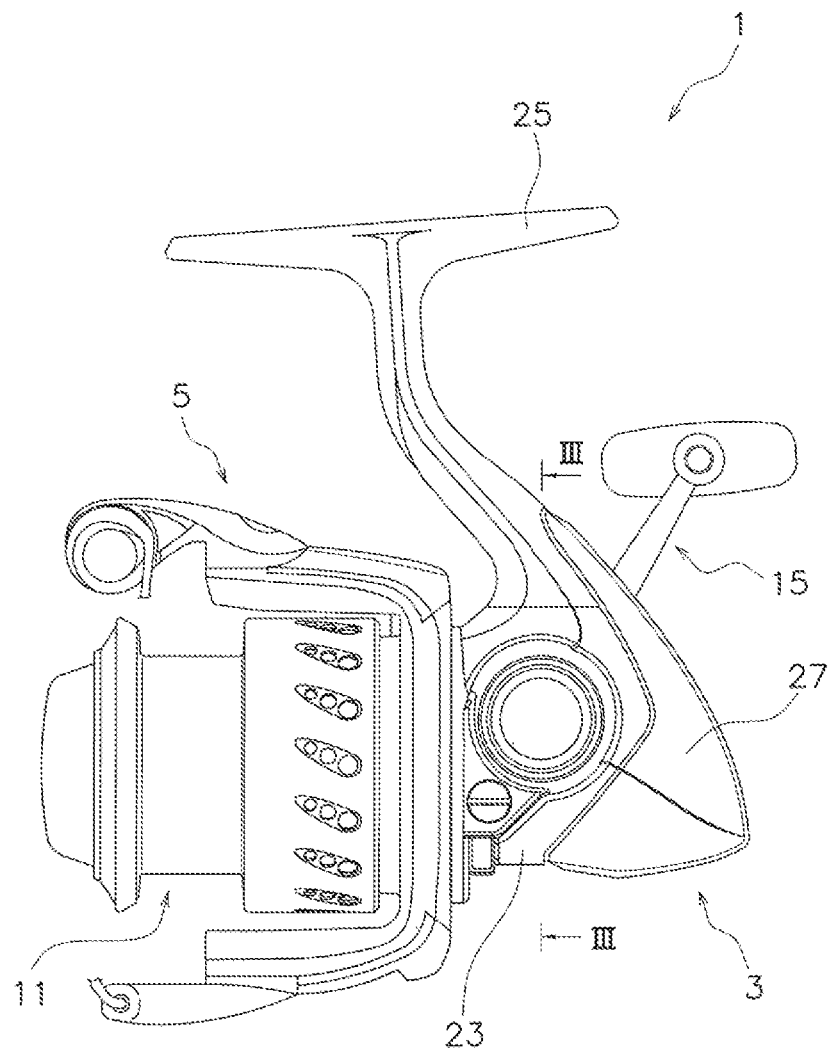
FIG. 1 is a side view of a spinning reel adopting one embodiment of the present disclosure.
Figure 2:
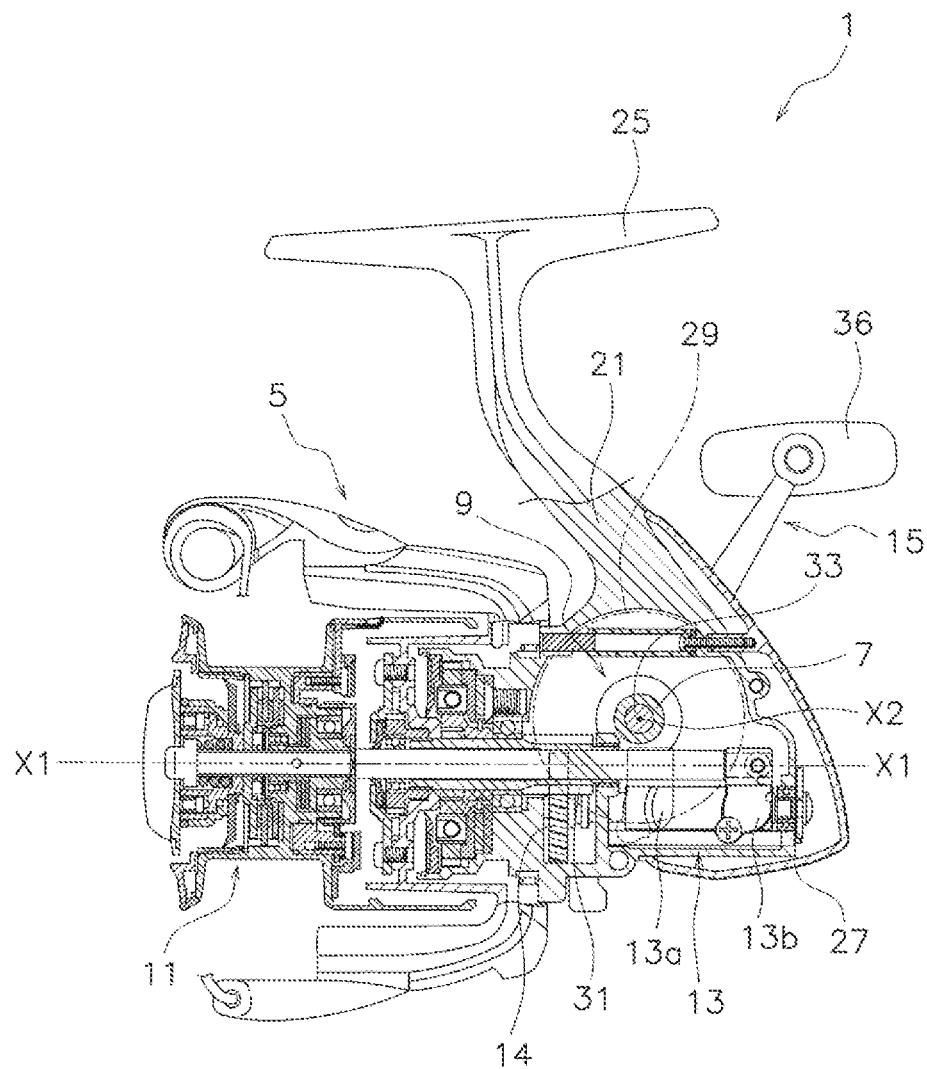
FIG. 2 is a side sectional view of the spinning reel.

As illustrated in FIGS. 1 and 2, a spinning reel 1 according to an embodiment of the present disclosure includes a drive shaft 7 and a handle assembly 15. Specifically, the spinning reel 1 includes a reel main body 3, a rotor 5, a rotor drive mechanism 9 including the drive shaft 7, a spool 11, an oscillating mechanism 13, and the handle assembly 15.

Note that in the present embodiment, a "first axial direction" is defined by a direction in which an axis X1 of a spool shaft 17 (center of spool shaft 17) extends. A "first radial direction" is defined by a radial direction away from the spool axis X1, and a "first circumferential direction" is defined by a circumferential direction about the spool axis X1.

Further, a "second axial direction" is defined by a direction in which an axis X2 of the drive shaft 7 (drive axis X2) extends. A "second radial direction" is defined by a radial direction away from the drive axis X2, and a "second circumferential direction" is defined by a circumferential direction about the drive axis X2.

<Reel Main Body>

The reel main body 3 rotatably supports the handle assembly 15. As illustrated in FIGS. 1 and 2, the reel main body 3 includes a reel body 21, a lid member 23, a rod-mounting part 25, and a guard member 27. The reel body 21 has an internal space. The rotor drive mechanism 9 and the oscillating mechanism 13 are disposed in the internal space of the reel body 21 (refer to FIG. 2).

The lid member 23 covers the reel body 21. The lid member 23 is detachably attached to the reel body 21. The rod-mounting part 25 has function for mounting a fishing rod. The rod-mounting part 25 extends upward from the reel body 21. The rod-mounting part 25 is formed to have a substantially T shape. The guard member 27 covers rear portions of the reel body 21 and the lid member 23.

<Rotor>

The rotor 5 is used for winding a fishing line around the spool 11. As illustrated in FIGS. 1 and 2, the rotor 5 is rotatably supported with respect to the reel main body 3. Specifically, the rotor 5 is rotatably supported on the front portion of the reel main body 3 via the rotor drive mechanism 9.

<Rotor Drive Mechanism>

As illustrated in FIG. 2, the rotor drive mechanism 9 rotates the rotor 5 in conjunction with the rotation of the handle assembly 15. The rotor drive mechanism 9 includes the drive shaft 7, a drive gear 29, and a pinion gear 31.

The drive shaft 7 is rotatably supported by the reel main body 3. The drive shaft 7 is formed to have a cylindrical shape. The handle assembly 15 is integrally and rotatably attached to the drive shaft 7. For example, a shaft member 33 (to be described later) of the handle assembly 15 is integrally and rotatably attached to the drive shaft 7. In detail, the shaft member 33 of the handle assembly 15 is attached to either one of both ends of the drive shaft 7 so as to be integrally rotatable therewith.

The drive gear 29 is a face gear that meshes with the pinion gear 31. The drive gear 29 is disposed on the drive shaft 7 so as to rotate integrally with the drive shaft 7. Note that the drive gear 29 can be formed integrally with the drive shaft 7 or can be formed separately from the drive shaft 7. The pinion gear 31 meshes with the drive gear 29. The pinion gear 31 is formed to have a cylindrical shape. The pinion gear 31 is rotatably supported by the reel main body 3. The pinion gear 31 is integrally rotatably mounted on the rotor 5.

<Spool>

A fishing line is wound around the spool 11. The spool 11 is disposed to be movable with respect to the reel main body 3. Specifically, as illustrated in FIG. 2, the spool 11 is mounted on the spool shaft 17. The spool shaft 17 is inserted inside the pinion gear 31 in the radial direction. The oscillating mechanism 13 moves the spool shaft 17 in the first axial direction (front-rear direction) with respect to the reel main body 3.

<Oscillating Mechanism>

As illustrated in FIG. 2, the oscillating mechanism 13 moves the spool 11 in the first axial direction (front-rear direction) via the spool shaft 17. The oscillating mechanism 13 includes a traverse cam shaft 13a and a slider 13b.

The traverse cam shaft 13a is arranged parallel to the spool shaft 17. The traverse cam shaft 13a guides the slider 13b in the first axial direction (front-rear direction). The slider 13b is fixed to one end (rear end) of the spool shaft 17. The slider 13b moves together with the spool shaft 17 in the first axial direction (front-rear direction) along the traverse cam shaft 13a.

An intermediate gear 14 is fixed to one end of the traverse cam shaft 13a. The intermediate gear 14 meshes with the pinion gear 31 via a speed reduction mechanism (not shown).

<Handle Assembly>

The handle assembly 15 can be selectively mounted on the left or the right side of the reel main body 3. On the side where the handle assembly 15 is not mounted, a cap member 16 is mounted thereon.

Figure 3:
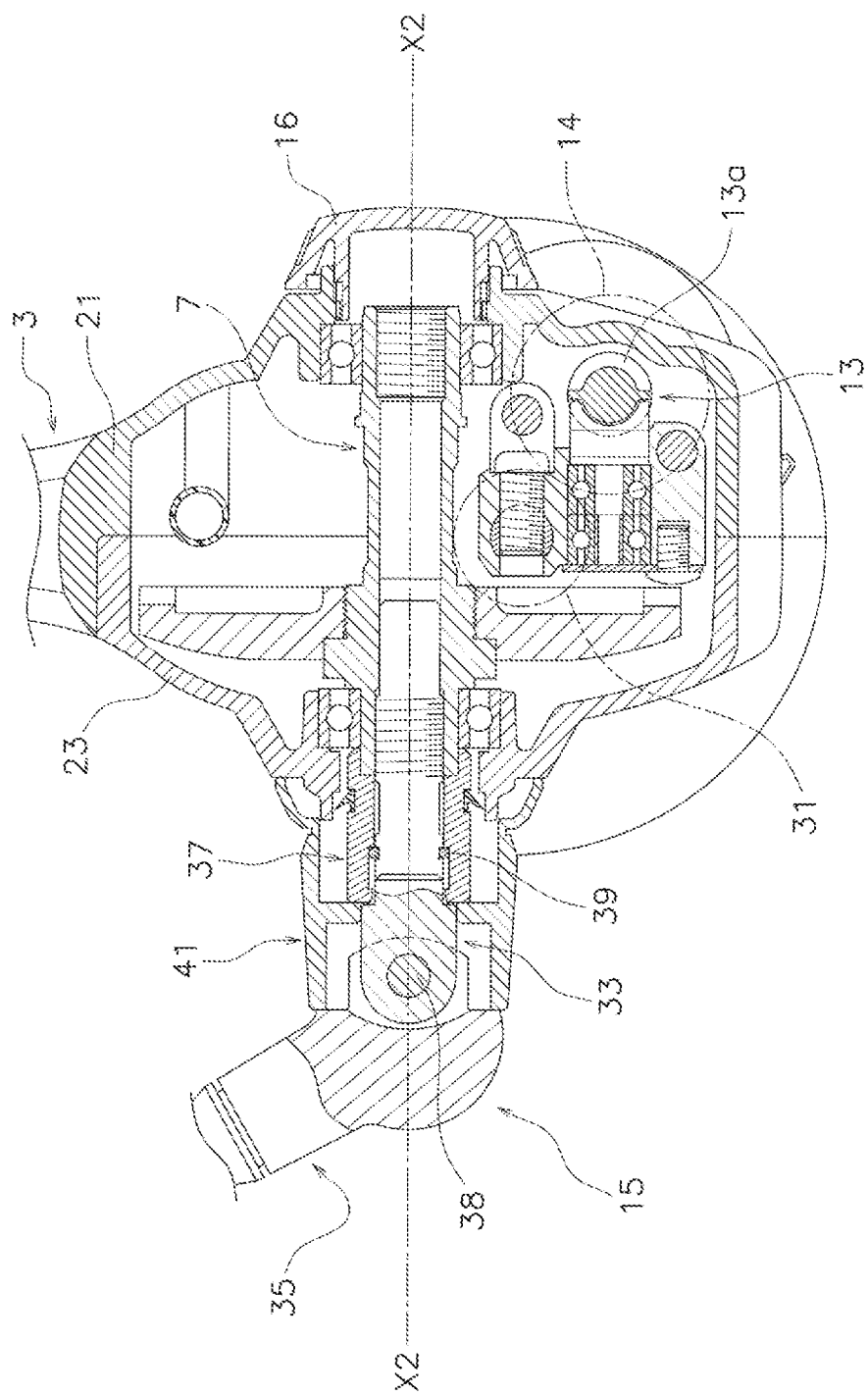
FIG. 3 is a cross-sectional view taken along section line III-III in FIG. 1.
Figure 4:
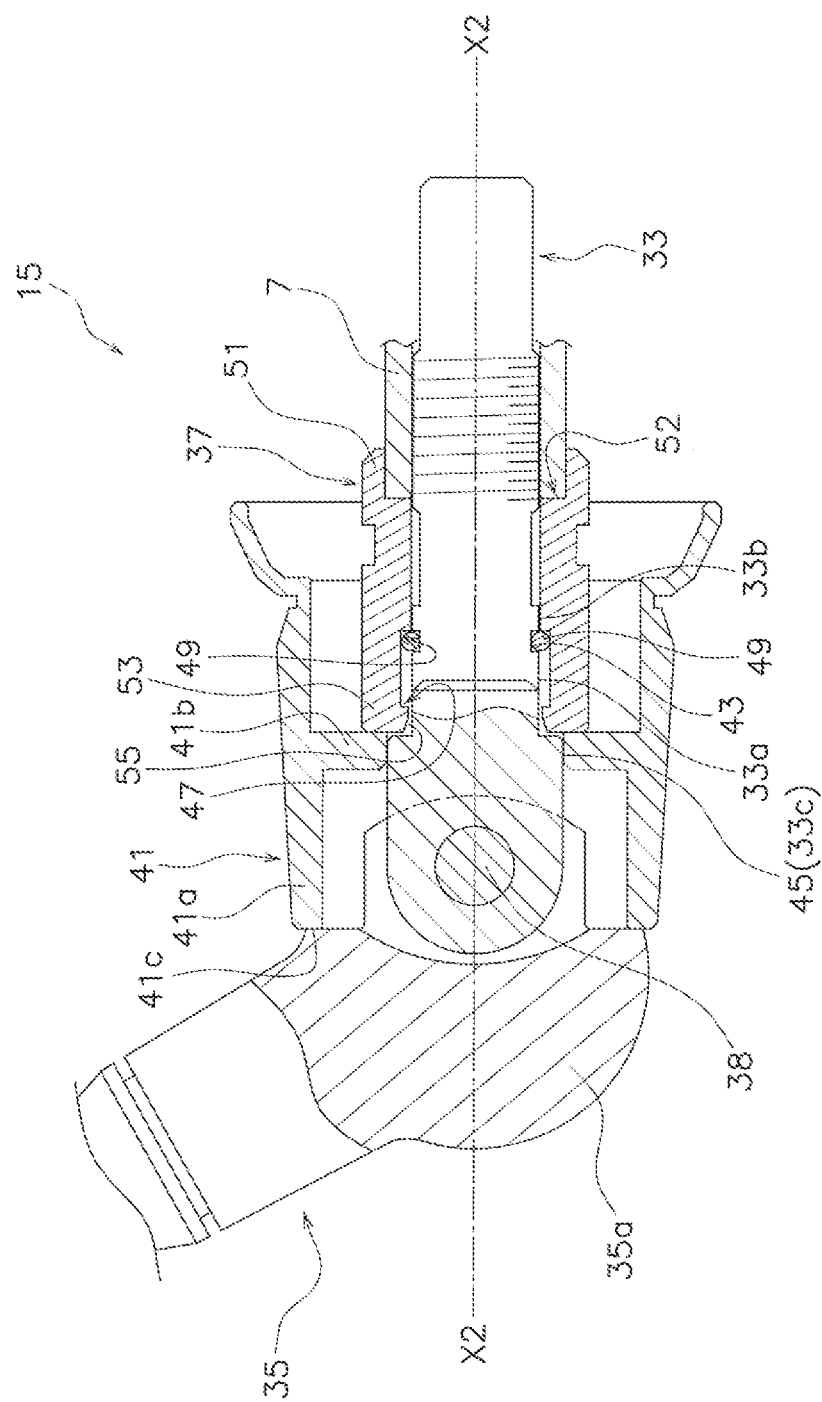
FIG. 4 is a partially enlarged cross-sectional view of a handle assembly.

For instance, FIGS. 1 and 2 illustrate an example in which the handle assembly 15 is mounted on the right side of the reel main body 3. In FIGS. 3 and 4, an example is illustrated in which the handle assembly 15 is mounted on the left side of the reel main body 3.

As shown in FIG. 3, the handle assembly 15 is configured to be rotatable integrally with the drive shaft 7. The handle assembly 15 includes the shaft member 33, a handle arm 35, a tubular member 37, and an elastic member 39. The handle assembly 15 further includes a cover member 41. In detail, the handle assembly 15 includes the shaft member 33, the handle arm 35, a handle knob 36 (refer to FIG. 2), the tubular member 37, and the cover member 41.

(Shaft Member)

As illustrated in FIG. 3, the shaft member 33 is configured to be integrally rotatable with the drive shaft 7. For example, the shaft member 33 is attached to the inner peripheral portion of the drive shaft 7 so as to be rotatable integrally with the drive shaft 7. Here, an end portion of the shaft member 33 is screwed into the inner peripheral portion of the drive shaft 7 so as to rotate integrally with the drive shaft 7.

Figure 5:
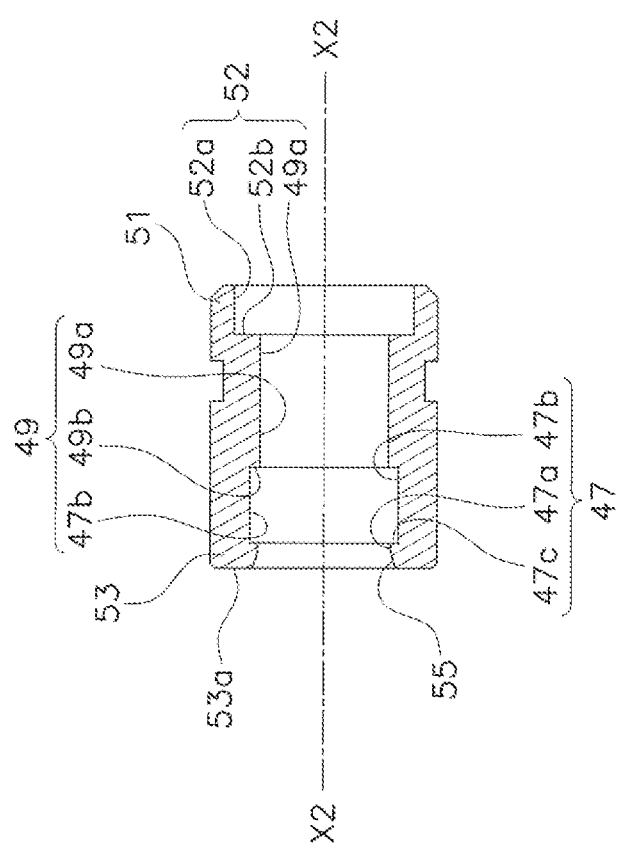
FIG. 5 is a partially enlarged cross-sectional view of a tubular member of the handle assembly.

As illustrated in FIGS. 4 and 5, the shaft member 33 includes an annular recess 43 (an example of the arrangement portion) for arranging the elastic member 39 and a positioning portion 45.

The annular recess 43 is mounted annularly on the outer peripheral surface of the shaft member 33. The annular recess 43 is formed so as to recess from the outer peripheral surface of the shaft member 33 and extends in the second circumferential direction. For example, the outer peripheral surface of the shaft member 33 includes a first outer peripheral surface 33a and a second outer peripheral surface 33b. The first outer peripheral surface 33a and the second outer peripheral surface 33b are provided at an interval in the second axial direction. The annular recess 43 is disposed between the first outer peripheral surface 33a and the second outer peripheral surface 33b. The first and second outer peripheral surfaces 33a and 33b are formed with a larger diameter than that of the bottom of the annular recess 43.

The positioning portion 45 is used for positioning the cover member 41 in the second radial direction. The outer peripheral surface of the shaft member 33 on the side of the handle arm 35 is used as the positioning portion 45. For example, the outer peripheral surface of the shaft member 33 further includes a third outer peripheral surface 33c. The third outer peripheral surface 33c is formed to have a diameter larger than the first and second outer peripheral surfaces 33a and 33b. The cover member 41 is positioned in the second radial direction with respect to the shaft member 33 by the third outer peripheral surface 33c.

(Handle Arm and Handle Knob)

As illustrated in FIGS. 3 and 4, the handle arm 35 is connected to the shaft member 33. For example, the handle arm 35 is connected to the shaft member 33 via a connecting shaft 38. Note that the handle arm 35 can be connected to the shaft member 33 in a swingable manner, or can be connected to the shaft member 33 in a non-swingable manner.

Note that in a case of swingably connecting the handle arm 35 to the shaft member 33, when a user performs fishing, the handle arm 35 is held at a predetermined angle by the shaft member 33 through a lock mechanism (not shown). When the user releases the lock mechanism, the handle arm 35 is folded.

As illustrated in FIG. 2, the handle knob 36 is mounted on the handle arm 35. The handle knob 36 is mounted on the tip of the handle arm 35 so as to be rotatable around an axis approximately parallel to the shaft member 33.

(Tubular Member)

As illustrated in FIGS. 3 and 4, the tubular member 37 is disposed between the drive shaft 7 and the handle arm 35 on the outer periphery of the shaft member 33 in order to position the handle arm 35 with respect to the drive shaft 7. Specifically, the tubular member 37 is disposed outside the shaft member 33 in the second radial direction and between the drive shaft 7 and the handle arm 35 in the second axial direction.

More specifically, the tubular member 37 is disposed outside the shaft member 33 in the second radial direction and between the drive shaft 7 and the cover member 41 in the second axial direction. The tubular member 37 is configured to contact the drive shaft 7 and the cover member 41 in the second axial direction. In a state where the shaft member 33 is attached to the drive shaft 7 so as to be integrally rotatable, the tubular member 37 is held between the drive shaft 7 and the cover member 41.

As illustrated in FIG. 4, the tubular member 37 has a first step portion 47 (an example of the abutting portion) and a second step portion 49. The tubular member 37 further has a first end portion 51 and a second end portion 53. The tubular member 37 further has a tapered portion 55. That is, the tubular member 37 includes the first step portion 47, the second step portion 49, the first end portion 51, the second end portion 53, and the taper portion 55.

As illustrated in FIG. 5, the first step portion 47 is provided to prevent the tubular member 37 from falling off. The first step 47 is formed to have an annular shape. The first step portion 47 constitutes the inner peripheral surface of the tubular member 37. The first step portion 47 includes a first inner peripheral surface 47a, a first bottom surface 47b, and a first wall surface 47c (an example of a wall portion).

The first inner peripheral surface 47a forms the inner peripheral surface of the second end portion 53. In a state where the shaft member 33 is mounted on the drive shaft 7, the first inner peripheral surface 47a faces the first outer peripheral surface 33a of the shaft member 33. The first bottom surface 47b is formed to have a larger diameter than the first inner peripheral surface 47a. Specifically, the first bottom surface 47b is formed to have a diameter that is larger than the corners of the first inner peripheral surface 47a and the first wall surface 47c. The first wall surface 47c abuts against the elastic member 39 to prevent the tubular member 37 from falling off. The first wall surface 47c extends from the first bottom surface 47b toward the drive axis X2, and is connected to the first inner peripheral surface 47a.

The second step portion 49 constitutes the inner peripheral surface of the tubular member 37. The second step portion 49 is located at an interval from the first step portion 47 in the second axial direction. The second step portion 49 includes a second inner peripheral surface 49a, the above-mentioned first bottom surface 47b, and a second wall surface 49b.

In a state where the shaft member 33 is mounted on the drive shaft 7, the second inner peripheral surface 49a faces the second outer peripheral surface 33b of the shaft member 33. The first bottom surface 47b is formed to have a larger diameter than the second inner peripheral surface 49a. The second wall surface 49b faces the first wall surface 47c in the second axial direction. The second wall surface 49b extends from the first bottom surface 47b toward the drive axis X2, and is connected to the second inner peripheral surface 49a.

As illustrated in FIG. 4, the first end portion 51 is located closer to the drive shaft 7. The first end portion 51 is in contact with the drive shaft 7. The first end portion 51 has a third step portion 52. The third step portion 52 is located at the inner periphery of the first end portion 51.

As illustrated in FIG. 5, the third step portion 52 has the above-described second inner peripheral surface 49a, a second bottom surface 52a, and a third wall surface 52b. The second bottom surface 52a is formed to have a large diameter. The third wall surface 52b is in contact with the end portion of the drive shaft 7. The third wall surface 52b extends from the second bottom surface 52a toward the drive axis X2, and is connected to the second inner peripheral surface 49a.

The second end portion 53 is located closer to the handle arm 35. The second end portion 53 is in contact with the cover member 41. For example, the third wall surface 52b of the first end portion 51 and an end surface 53a of the second end portion 53 are in contact with the end portion of the drive shaft 7 and a first abutting portion 41b (to be described later) of the cover member 41, respectively. In this state, the tubular member 37 is held between the drive shaft 7 and the cover member 41.

The tapered portion 55 forms the inner peripheral surface of the second end portion 53. For example, the tapered portion 55 extends from the first inner peripheral surface 47a described above toward the end surface 53a of the second end portion 53. The tapered portion 55 is enlarged in its diameter toward the handle arm 35. For example, the diameter of the tapered portion 55 increases from the first inner peripheral surface 47a toward the end surface 53a of the second end portion 53.

(Elastic Member)

As illustrated in FIG. 4, the elastic member 39 is disposed between the shaft member 33 and the tubular member 37 in order to prevent the tubular member 37 from falling off the shaft member 33. The elastic member 39 is formed to have an annular shape. The annular elastic member 39 is, for example, an O-ring.

The annular elastic member 39 is disposed in the annular recess 43 of the shaft member 33. In this state, a portion of the annular elastic member 39 protrudes from the first outer peripheral surface 33a of the shaft member 33. Apart of the annular elastic member 39 also protrudes from the second outer peripheral surface 33b of the shaft member 33.

A portion of the annular elastic member 39, for example, an outer peripheral portion thereof protruding from the first outer peripheral surface 33a, is disposed between the first step portion 47 (first wall surface 47c in FIG. 5) and the second step portion 49 (second wall surface 49b in FIG. 5). Thus, in a state where the annular elastic member 39 is disposed in the annular recess 43, the outer peripheral portion of the annular elastic member 39 is disposed radially outward from the first outer peripheral surface 33a of the shaft member 33.

Here, in a state in which the handle assembly 15 (shaft member 33) is detached from the drive shaft 7, when the tubular member 37 moves in the second axial direction (second axial direction away from the handle arm 35) with respect to the shaft member 33, the outer peripheral portion of the annular elastic member 39 contacts the first wall surface 47c of the first step portion 47. As a result, the falling off of the tubular member 37 from the shaft member 33 is regulated.

(Cover Member)

As illustrated in FIGS. 3 and 4, the cover member 41 is a member that covers the tubular member 37. The cover member 41 is disposed between the handle arm 35 and the reel main body 3. The cover member 41 is disposed on the outer periphery of the shaft member 33 and the tubular member 37. The cover member 41 is positioned in the second radial direction by the shaft member 33.

The cover member 41 is configured to contact the handle arm 35 and the tubular member 37. Specifically, the cover member 41 is held between the handle arm 35 and the tubular member 37 in a state where the shaft member 33 is mounted on the drive shaft 7 so as to be integrally rotatable.

In this state, the cover member 41 and the reel main body 3 (for example, the lid member 23 in FIG. 3) are located to have a gap in between.

As illustrated in FIG. 4, the cover member 41 includes a cover main body 41a, the first abutting portion 41b, and a second abutting portion 41c. The cover main body 41a is formed to have a substantially cylindrical shape. Specifically, the cover main body 41a is disposed outside the tubular member 37 in the second radial direction.

The first abutting portion 41b is located on the inner peripheral portion of the cover main body 41a. The first abutting portion 41b is disposed to face the second end portion 53 of the tubular member 37 in the second axial direction. In a state where the shaft member 33 is mounted on the drive shaft 7 so as to be integrally rotatable, the first abutting portion 41b abuts the second end portion 53 of the tubular member 37.

Further, the inner peripheral surface of the first abutting portion 41b is disposed on the positioning portion 45 (third outer peripheral surface 33c) of the shaft member 33. Consequently, the cover member 41 is positioned with respect to the shaft member 33 in the second radial direction.

The second abutting portion 41c is located at the end part of the cover main body 41a. The second abutting portion 41c is disposed to face a base end portion 35a of the handle arm 35. In a state where the shaft member 33 is mounted on the drive shaft 7 so as to be integrally rotatable, the second abutting portion 41c contacts the base end portion 35a of the handle arm 35. Specifically, the second abutting portion 41c contacts the base end portion 35a of the handle arm 35 in a state where the handle arm 35 is not folded.

<Assembly of Handle Assembly and Attachment of Handle Assembly>

Here, the assembly of the handle assembly 15 will be described. First, the annular elastic member 39 is disposed in the annular recess 43 of the shaft member 33. Next, the end portion of the shaft member 33 to be closer to the drive shaft 7 is inserted into the inner peripheral portion of the tubular member 37 from the second end portion 53 of the tubular member 37.

Subsequently, when the annular elastic member 39 reaches the second end portion 53 of the tubular member 37, the annular elastic member 39 passes through the tapered portion 55 (first inner peripheral surface 47a) while being gradually compressed by the tapered portion 55 (first inner peripheral surface 47a). As a result, the annular elastic member 39 is disposed between the first step portion 47 and the second step portion 49. Next, the cover member 41 is disposed on the shaft member 33. For example, the first abutting portion 41b of the cover member 41 is disposed on the positioning portion 45 (third outer peripheral surface 33c) of the shaft member 33. Subsequently, the handle arm 35 having the handle knob 36 is attached to the end portion of the shaft member 33 via the connecting shaft 38. This is a state in which the handle assembly 15 is assembled.

In this state, when the tubular member 37 moves toward the end portion of the shaft member 33 (the end portion opposite to the handle arm 35), the first wall surface 47c of the first step portion 47 of the tubular member 37 contacts the outer peripheral portion of the annular elastic member 39. As a result, the falling off of the tubular member 37 from the shaft member 33 is regulated by the annular elastic member 39.

The handle assembly 15 can be attached to the drive shaft 7 so as to rotate integrally with the drive shaft 7. For example, the end portion of the shaft member 33 is screwed into the inner peripheral portion of the drive shaft 7. When the end portion of the shaft member 33 is screwed into the inner peripheral portion of the drive shaft 7, the end portion of the drive shaft 7 and the first end portion 51 (third wall surface 52b) of the tubular member 37 are brought into contact with each other. Also, the second end portion 53 (end surface 53a) of the tubular member 37 and the first abutting portion 41b of the cover member 41 are brought into contact with each other. Furthermore, the second abutting portion 41c of the cover member 41 and the base end portion 35a of the handle arm 35 are brought into contact with each other.

With this configuration, the tubular member 37 is held between the drive shaft 7 and the cover member 41. The cover member 41 is held between the tubular member 37 and the handle arm 35. That is, the tubular member 37 and the cover member 41 are held between the drive shaft 7 and the handle arm 35. This state is a state where the handle assembly 15 is rotatably supported by the reel main body 3 via the drive shaft 7 (the state shown in FIGS. 3 and 4).

On the other hand, the handle assembly 15 is detached from the drive shaft 7 by a procedure that is opposite to the procedure described above. At this time, even if the tubular member 37 moves toward the end portion of the shaft member 33 (end portion closer to the drive shaft 7), as described above, the first wall surface 47c of the first step portion 47 of the tubular member 37 contact the outer peripheral portion of the annular elastic member 39. That is, also in this case, the falling off of the tubular member 37 from the shaft member 33 is regulated by the annular elastic member 39.

(1) In the handle assembly 15, by disposing the annular elastic member 39 between the shaft member 33 and the tubular member 37, the falling off of the tubular member 37 from the shaft member 33 can be regulated. That is, in the handle assembly 15, the falling off of the tubular member 37 from the shaft member 33 can be regulated by the annular elastic member 39 without a screw portion in each of the shaft member 33 and the tubular member 37 as in the prior art.

(2) In the handle assembly 15, the first step portion 47 of the tubular member 37 is brought into contact with the annular elastic member 39 in a state where the annular elastic member 39 is disposed in the annular recess 43 of the shaft member 33, whereby the tubular member 37 can be regulated from falling off from the shaft member 33. With this configuration, the falling off of the tubular member 37 from the shaft member 33 can be regulated by the annular elastic member 39.

(3) In the handle assembly 15, the annular recess 43 is recessed from the outer peripheral surface of the shaft member 33 and extends in the second circumferential direction. In this case, the first step portion 47 includes the first bottom surface 47b having a diameter that is larger than that of the first inner peripheral surface 47a of the tubular member 37. With this configuration, the annular elastic member 39 can be easily disposed in the annular recess 43. Further, the first step portion 47 of the tubular member 37 can be easily brought into contact with the annular elastic member 39.

(4) In the handle assembly 15, the outer peripheral portion of the annular elastic member 39 is disposed outside the first outer peripheral surface 33a of the shaft member 33 so as to contact the first wall surface 47c of the first step portion 47 in a state where the annular elastic member 39 is disposed in the annular recess 43. With this configuration, the falling off of the tubular member 37 from the shaft member 33 can be regulated by the annular elastic member 39.

(5) In the handle assembly 15, the inner peripheral surface of the second end portion 53 of the tubular member 37 has the tapered portion 55 whose diameter is enlarged toward the handle arm 35. With this configuration, the annular elastic member 39 is guided from the tapered portion 55 of the tubular member 37 to between the shaft member 33 and the tubular member 37, and thus can be easily disposed between the shaft portion 33 and the tubular member 37.

(6) The handle assembly 15 is configured such that the cover member 41 is capable of contacting the handle arm 35 and the tubular member 37 in the second axial direction. The tubular member 37 is configured to be capable of contacting the drive shaft 7 and the cover member 41 in the second axial direction. With this configuration, the handle arm 35 can be reliably positioned with respect to the drive shaft 7.

<Other Embodiments>

One preferred embodiment of the present disclosure has been described above; however, the present disclosure is not limited to the above embodiment, and a variety of changes can be made without departing from the scope of the present disclosure. In particular, a plurality of embodiments and modifications described in the present specification can be arbitrarily combined on an as-needed basis.

(a) In the above embodiment, the handle assembly 15 having a single handle is taken as an example; however, the present disclosure can also be applied to the handle assembly 15 having a double handle.

(B) The aforementioned embodiment has exemplified that the annular elastic member 39 is disposed between the shaft member 33 and the tubular member 37 in the second radial direction. In this case, if the outer peripheral portion of the annular elastic member 39 is configured so as to be able to contact the first wall surface 47c of the first step portion 47, the annular elastic member 39 can contact or may not be in contact with the inner peripheral surface (first bottom surface 47b) of the tubular member 37.

REFERENCE SIGNS LIST 1 spinning reel
7 drive shaft
15 handle assembly
33 shaft member
33a first outer peripheral surface
35 handle arm
37 tubular member
39 annular elastic member
41 cover member
43 annular recess
47 first step portion
47a first inner peripheral surface
47b first bottom surface
47c first wall surface
53 second end portion
55 tapered portion

What is claimed is:

1. A handle assembly for a spinning reel, the handle assembly configured to be rotatable integrally with a drive shaft of the spinning reel, comprising:
   a shaft member configured to be rotatable integrally with the drive shaft, the shaft member including an arrangement portion having an annular recess that is recessed from an outer peripheral surface of the shaft member and extends in a circumferential direction;
   a handle arm coupled to the shaft member;
   a tubular member positionable between the drive shaft and the handle arm on an outer periphery of the shaft member in order to position the handle arm with respect to the drive shaft; and an annular elastic member disposed in the annular recess between the shaft member and the tubular member in order to regulate falling off of the tubular member from the shaft member.

2. The handle assembly for a spinning reel according to claim 1, wherein the tubular member includes an abutting portion configured to contact the elastic member.

3. The handle assembly for a spinning reel according to claim 2, wherein the abutting portion is a step portion having a bottom surface whose diameter is larger than a diameter of an inner peripheral surface of the tubular member.

4. The handle assembly for a spinning reel according to claim 3, wherein the step portion extends annularly.

5. The handle assembly for a spinning reel according to claim 3, wherein a part of the elastic member is disposed outside the outer peripheral surface of the shaft member so as to contact a wall portion of the step portion.

6. The handle assembly for a spinning reel according to claim 5, wherein the wall portion of the step portion extends radially inward from the bottom surface of the step portion.

7. The handle assembly for a spinning reel according to claim 6, wherein the elastic member is configured to contact the wall portion of the step portion so as to regulate the falling off of the tubular member from the shaft member in a case where the tubular member moves away from the handle arm in an axial direction.

8. The handle assembly for a spinning reel according to claim 1, wherein the tubular member includes a first end portion adapted to be located closer to the drive shaft and a second end portion adapted to be located closer to the handle arm, and an inner peripheral surface of the second end portion has a tapered portion whose diameter is enlarged toward the handle arm.

9. The handle assembly for a spinning reel according to claim 1 further comprising:

a cover member configured to cover the tubular member, wherein the cover member is configured to contact the handle arm and the tubular member in an axial direction, and the tubular member is configured to contact the drive shaft and the cover member in the axial direction.

10. The handle assembly for a spinning reel according to claim 9, wherein the shaft member further includes a positioning member configured to position the cover member in the axial direction.

11. A spinning reel comprising:

a drive shaft; and the handle assembly according to claim 1 configured to be integrally rotatable with the drive shaft.

12. The spinning reel according to claim 11, wherein in a state where the shaft member is mounted on the drive shaft so as to be integrally rotatable therewith, the tubular member is held between the drive shaft and a cover member, and the cover member is held between the handle arm and the tubular member.

* * * * *